United States Patent
Robinson et al.

[11] Patent Number: 6,141,411
[45] Date of Patent: Oct. 31, 2000

[54] LEAST COST ROUTER

[75] Inventors: David Graeme Robinson; Paul Owen Furmedge; Kamal Martin Ahmed, all of Hants, United Kingdom

[73] Assignee: Eurotel Telecom Limited, United Kingdom

[21] Appl. No.: 08/945,682

[22] PCT Filed: Apr. 19, 1996

[86] PCT No.: PCT/GB96/00944

§ 371 Date: Jan. 26, 1998

§ 102(e) Date: Jan. 26, 1998

[87] PCT Pub. No.: WO96/33583

PCT Pub. Date: Oct. 24, 1996

[30] Foreign Application Priority Data

Apr. 21, 1995 [GB] United Kingdom .................. 9508203

[51] Int. Cl.[7] .................................................. H04M 3/42
[52] U.S. Cl. ...................... 379/221; 379/201; 379/216; 379/219; 379/220
[58] Field of Search ................... 379/221, 219, 379/220, 216, 354, 355, 356, 112, 115, 113, 114, 201

[56] References Cited

U.S. PATENT DOCUMENTS

| | | | |
|---|---|---|---|
| 4,555,594 | 11/1985 | Friedes et al. | 379/220 |
| 4,565,903 | 1/1986 | Riley | 379/220 |
| 4,577,066 | 3/1986 | Bimonte et al. | 197/18 B |
| 4,751,728 | 6/1988 | Treat | 379/113 |
| 4,791,665 | 12/1988 | Bogart et al. | 379/207 |
| 4,797,915 | 1/1989 | Bowker et al. | 379/234 |
| 4,866,763 | 9/1989 | Cooper et al. | 379/201 |
| 4,873,720 | 10/1989 | Son | 379/216 |
| 4,964,159 | 10/1990 | Son | 379/216 |
| 5,289,536 | 2/1994 | Hokari | 379/221 |
| 5,341,415 | 8/1994 | Baran | 379/201 |
| 5,550,910 | 8/1996 | DeJager | 379/220 |
| 5,550,915 | 8/1996 | Partridge, III | 379/355 |
| 5,563,938 | 10/1996 | Soshea et al. | 379/120 |
| 5,644,633 | 7/1997 | Kaufeld et al. | 379/355 |

FOREIGN PATENT DOCUMENTS

| | | |
|---|---|---|
| 0540258 | 10/1992 | European Pat. Off. . |
| 2098264 | 10/1990 | Japan . |
| 2218595 | 11/1989 | United Kingdom . |

OTHER PUBLICATIONS

IEEE International Conference on Communications 1985, Jun. 23–26, 1996, pp. 791–794.

*Primary Examiner*—Krista Zele
*Assistant Examiner*—William J. Deane, Jr.
*Attorney, Agent, or Firm*—Dick and Harris

[57] ABSTRACT

A telecommunications call routing device provides call routing based on digits received at the device from an exchange. The routing device has the facility to route by one of a plurality of networks, including both private networks and public networks, and to force calls to be placed over a private network if a route is available. Early reconnection of calls is also possible by monitoring call progress tones, measuring the pauses between dialed digits and reconnecting the exchange to a network or PBX as soon as the routing decision is made.

9 Claims, 15 Drawing Sheets

FIG 3

| Digits | Preferred Route | Fallback Route | Digit Mapping |
|---|---|---|---|
| 0 | MERCURY | None | None |
| 00 | WORLDCOM 166 | None | None |
| 010 | WORLDCOM 166 | None | None |
| 01256 | BT | None | None |
| 01264 | BT | None | None |
| 01201240460 | PRIVATE | None | 7500460 |
| 01329 | BT | None | None |
| 01420 | BT | None | None |
| 01489 | BT | None | None |
| 01703 | BT | None | None |
| 01730 | BT | None | None |
| 01794 | BT | None | None |
| 01962 | BT | None | None |
| 0256 | BT | None | None |
| 0264 | BT | None | None |
| 0329 | BT | None | None |
| 0345 | BT | None | None |
| 0420 | BT | None | None |
| 0426 | BT | None | None | ns.
LEAST COST ROUTER

CROSS-REFERENCES TO RELATED APPLICATIONS

This application is a United States National Phase application under 35 USC 371(c) and 37 CFR 1.495 of PCT/GB96/00944, the priority date of which is hereby claimed.

BACKGROUND OF THE INVENTION

1) Field of the Invention

This invention relates to Least Cost Routers for use in telecommunications. A Least Cost Router is a device for selecting, for a given communications call, one of a number of carriers (telecommunications service providers) depending upon variables such as cost. The cost of particular types of call, both national and international, varies from one carrier to another. An example in the United Kingdom is the price differential between British Telecom and Mercury Communications for different types of call. A Least Cost Router provides the facility for pro-programming which types of call are routed via which carrier. In this way, the user may simply select which types of call should be routed to which carrier and the call will automatically be routed by the cheapest available carrier.

2) Description of the Prior Art

A prior art call routing controller, known as Smart-1 ™ is produced by Mitel ™ Telecom Limited, of Gwent Wales. This device may be connected between the users extension and the local exchange, or a PABX and a local exchange, so that it may check each number the user dials. On recognizing a number, it may absorb some of the digits and replace them with previously stored digits to route the call via an alterative carrier, deny the call completely or record the start and duration of the call and print the information on an attached printer.

As an example, to connect to Mercury, three numbers must usually be sent. First a number telling BTs local exchange that you want to connect to the new network, then a customer identification number (PIN) and finally a number giving the address of the subscriber the user wishes to talk to, The process of dialling these numbers is laborious for the user and is circumvented by this prior art router. On installing the router, the phone number needed to reach the alternative network and the pin are stored within the device. These numbers may then be sent to the local exchange automatically by the router when the user dials a number on the telephone.

In addition to call routing, this unit provides a number of memories so that telephone numbers may be stored in the memories and accessed by the user dialling a shorter code on the telephone. Dialling of the pre-stored number is then initiated simply by dialling the short code. This feature must be preprogrammed, and the code supplied to the user so that the user has a list of short codes which may be dialed to initiate the calling of a particular telephone number. This is similar to memory stores known in telephones and facsimile machines.

There are further disclosures which provide background to the present invention. IEEE International Conference on Communications 1985 discloses a system of overlap outpulsing in which digits are always regenerated without connecting a terminal and network. Dialled digits are sent when the end of dialling is reached. Such digit regeneration is also disclosed in GB-A-2218595 in which all digits dialled by a terminal are regenerated and reconnects a terminal blindly after an arbitrary timeout.

Digit analysis is disclosed in EP-A-0,540,258 which also discloses monitoring for a dial tone before sending digits. Access codes are disclosed in U.S. Pat. No. 4,791,665 in which access codes are sent to an exchange.

A line pool is disclosed in U.S. Pat. No. 4,797,915 which discloses routing amongst a predetermined pool of lines.

We have appreciated problems with all such prior systems.

SUMMARY OF THE INVENTION

Broadly, the invention, in its various aspects aims to overcome the deficiencies with the prior art. A number of new facilities have been provided which were not envisaged in the prior art.

The invention generally resides in three aspects:

A first aspect reduces the time between dialling a number and connecting the user to the carrier by recognising the duration and spaces of digits dialled by a user, or machine, and connects the dialler to the carrier once the best carrier is determined, but before dialling is complete. By analysing the duration and spaces of dialled digits, the best time to connect the user is determined to prevent any time delay between completion of dialling and connecting the call.

This provides a significant advantage over the two known prior art reconnection techniques. The first prior art technique is to reconnect the path at a set time after the last digit is received from the dialler, This technique is based on the assumption that the user has finished dialling. The second prior art technique is to configure the unit to expect a specified length of subscriber number depending upon the initial digits in the number which specify the code. This technique requires a lot of pre-programming and falls in circumstances when a number is not the expected length. For example all numbers beginning with the digit 2 might be expected to be six digits long. However, in other locations, such numbers may be expected to be seven digits tong. Both these prior art techniques may result in the party receiving the call being connected before the party making the call. The party receiving the call will, therefore, be connected to a dead line for a number of seconds. This problem is circumvented by this aspect of the invention.

A second aspect resides in the facility to prevent telephone calls being sent by an outside carrier, when operating in a private network and a route is available by the network to complete the call. We refer to this technique as Forced Private Network Loopback. The LCR identifies calls that could benefit from network enforcement through a lookup table. Break-out calls (local call or A rate call charges) and On-net calls (calls to PBX's that are on the private network) can be identified by the LCR. A rate calls are the local discount BT rate. A break out call is one in which part of the call is connected by a private network, and the remainder of the call is sent by a public carrier. The LCR can determine how to route such breakout calls in the cheapest way by reference to the lookup table. A typical breakout call would be carried as far as possible within a private network, and then the remainder of the path is connected by a public carrier.

The LCR utilises a soft tone detection system to monitor for private network congestion during the network enforcement call routing process. If a congestion tone is detected the LCR can fullback to a directly connected carrier, such as British Telecom, or an directly connected carrier) without any intervention by the user. The fullback carrier may be chosen on the basis of least cost. Thus the best carrier, whether a private network, an external carrier or British Telecom (which is in itself a carrier) is selected. In this sense a carrier may be any network by which the call may be connected.

A third aspect resides in providing a fallback carrier in the event that a first network is unavailable. This ensures that a call may always be connected.

In particular, there is provided apparatus for disconnecting and reconnecting a terminal to a network for use with a routing device having a store for storing parameters relating to carrier routing information, comprising a switching path for selectively connecting the terminal direct to the network or via the routing device, means for disconnecting the terminal from the network when digits are dialled by the terminal, means for deciding which carrier the call is to be routed by in dependence on the parameters in the store and the digits dialled, and means for reconnecting the network once the routing decision is made but before all the digits have been received from the terminal.

There is also provided a method of disconnecting and reconnecting a terminal to a network using a routing device, the routing device comprising a switching path for selectively connecting the terminal direct to the network or via the routing device, is and a store for storing parameters relating to carrier routing information, the method comprising disconnecting the terminal from the network when digits are dialled by the terminal, deciding which carrier the call is to be routed by in dependence on the parameters in the store and the digits dialled, and reconnecting the network once the routing decision is made but before all the digits have been received from the terminal.

By reconnecting the user as soon as possible, the deficiency that a few seconds of the call may be missed at the beginning of the call exhibited by the prior art is overcome. An embodiment comprises means for monitoring a dialled digit, means for regenerating the dialled digit, means for checking whether the dialled digit is still active on completion of the regeneration, and means for reconnecting the terminal and network once the dialled digit finishes if the dialled digit was still active when the regeneration was completed. This connects the user to the exchange at the earliest opportunity after the routing decisions have been made.

An embodiment may also comprise means for detecting the minimum time interval between digits dialled by the terminal, means for determining whether this minimum time is long enough to allow reconnection of the terminal, and means for reconnecting the terminal and network if the time is long enough.

This makes use of the fact that there is a minimum spacing of digits dialled using telecommunications equipment which allows a decision to be made as to when it is safe to reconnect.

There is also provided a method of disconnecting and reconnecting a terminal to a network using a routing device, the routing device comprising a switching path for selectively connecting the terminal direct to the network or via the routing device, and a store for storing parameters relating to carrier routing information, the method comprising disconnecting the terminal from the network when digits are dialled by the terminal, deciding which carrier the call is to be routed by in dependence on the parameters in the store and the digits dialled, monitoring signals received from the network, and connecting the network and terminal if a call progress tone is received.

There is also provided an apparatus for disconnecting and reconnecting a terminal to a network for use with a routing device having a store for storing parameters relating to carrier routing information, comprising a switching path for selectively connecting the terminal direct to the network or via the routing device, means for disconnecting the terminal from the network when digits are dialled by the terminal, means deciding which carrier the call is to be routed by in dependence on the parameters in the store and the digits dialled, means for monitoring signals received from the network, and means for connecting the network and terminal if a call progress tone is received.

This allows the line to be monitored so that a call is connected immediately on receiving a call progress indication in the event that it is not possible to connect the call before.

There is also provided an apparatus for disconnecting and reconnecting a terminal to a network for use with a routing device having a store for storing parameters relating to carrier routing information, comprising a switching path for selectively connecting the terminal direct to the network or via the routing device, means for disconnecting the terminal from the network when digits are dialled by the terminal, means for deciding which carrier the call is to be routed by in dependence on the parameters in the store and the digits dialled, means for detecting the time interval of digits dialled by the terminal and means for reconnecting the network a time period after dialling is complete, wherein the time period is determined by the means for detecting the time interval of digits dialled.

This ensures that a call is connected even in the event that early reconnection is not possible, or a call progress tone is not received.

There is also provided a telecommunications routing device for connection between an exchange to which a telecommunications terminal is connected and a public network for routing a call, comprising a switching path for selectively connecting the output of the exchange direct to the public network, to the public network via the device or to another carrier, a store for storing parameters relating to routing information, and a control for controlling whether the output of the exchange is connected to the public network or to the other carrier in dependence on the digits dialled by the terminal and the parameters stored in the store.

There is also provided a method of routing a telecommunications call using a routing device connected between a telecommunications terminal and a network, the routing device comprising a switching path for selectively connecting the output of the exchange direct to the public network, to the public network via the device or to another carrier, a store for storing parameters relating to routing information, and a control for controlling whether the output of the exchange is connected to the public network or to the other carrier, the method comprising receiving digits dialled by a terminal, comparing the digits to parameters stored in the store, selecting the public network or other carrier in dependence on the comparison, and connecting the output of the exchange to the selected one of the public network or other carrier to connect the call.

This allows calls to be forced back to the exchange if the call should not be placed by an outside carrier, because the call is barred for example, or because there is an other route available for the call such as a private network.

There is also provided a telecommunications routing device for connection between a telecommunications terminal and a network, comprising a switching path for selectively connecting the terminal direct to the network, to the network via the routing device or to an alternative network, selection means for selecting either the network or the alternative network, and a control for controlling the selection means to select the alternative network it the network is unavailable.

There is also provided a method of routing a telecommunications call by one of a number of carriers using a routing device connected between a telecommunications terminal and a network, the routing device comprising a store for storing parameters relating to carrier routing information, selection means for selecting one of a plurality of carriers for routing the call, and means for detecting signals from the network, the method comprising receiving digits dialled by a terminal, comparing the digits to parameters stored in the store, selecting one of a number of carriers in dependence on the comparison, and accessing a fallback carrier if a signal is received from the one carrier indicating that the call cannot be connected.

This feature may advantageously be used in conjunction with the routing functions, and private network functions described above and allows a call to be connected in the event that the main network line is unavailable. In the embodiment described, the alternative B-line may be connected back to a PBX, or to an alternative network. Further auxilliary lines may also be provided as fall back positions if a main line is unavailable.

BRIEF DESCRIPTION OF THE DRAWINGS

An embodiment of the invention will now be described, by way of example only, with reference to the accompanying drawings in which:

FIG. 3 shows a typical digit lookup table;

DETAILED DESCRIPTION OF THE DRAWINGS

In the following description, the invention is described in the context of a telephone system. It is to be understood that this term covers all sorts of telecommunications transmissions including telephone and facsimile. In addition a switching path is described. This may comprise the switches as described, but may also employ no switching devices in the conventional sense in the signal path. Furthermore, the path selection could be provided by a separate device connected to the remaining LCR circuitry. A switching path in this context should be understood to be means for providing signal path selection.

Figure 1:
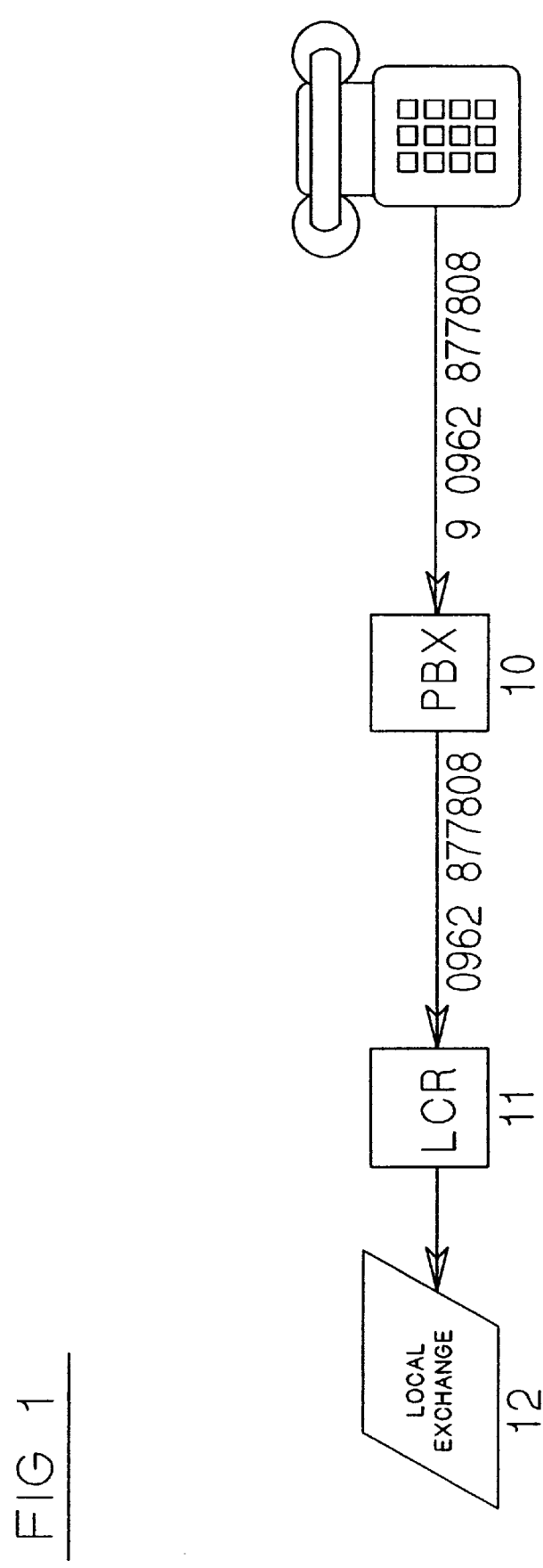
FIG. 1 is a schematic diagram showing a simplified arrangement of the LCR in a telephone system.

The position of a Least Cost Router (LCR) embodying the invention, within a telephone system, is shown in FIG. 1. A users telephone is connected to a private branch exchange (PBX) 10 which, if operated without an LCR, would then connect to a local exchange 2. As shown in FIG. 1, the LCR 11 is connected between the PBX and the local exchange.

Broadly, the operation of the LCR embodying the invention is as follows. Under normal operations, a transparent metallic path is established between the PBX 10 and the local exchange 12 so that incoming calls passes through the LCR unhindered. The metallic path is the connection between the customer equipment such as a PBX, telephone or fax machine through the LCR to a network. Outgoing calls, however, are intercepted by the LCR and the first few digits of the dialled number are examined. From these digits the destination area code is determined and the carrier offering the lowest cost for that call is selected. The LCR has the facility to dial digits required to access the carrier, such as the carrier identification and authorisation codes, which are then followed by the dialled subscriber number. After sufficient digits have been dialled, the transparent metallic path is restored.

Figure 2:
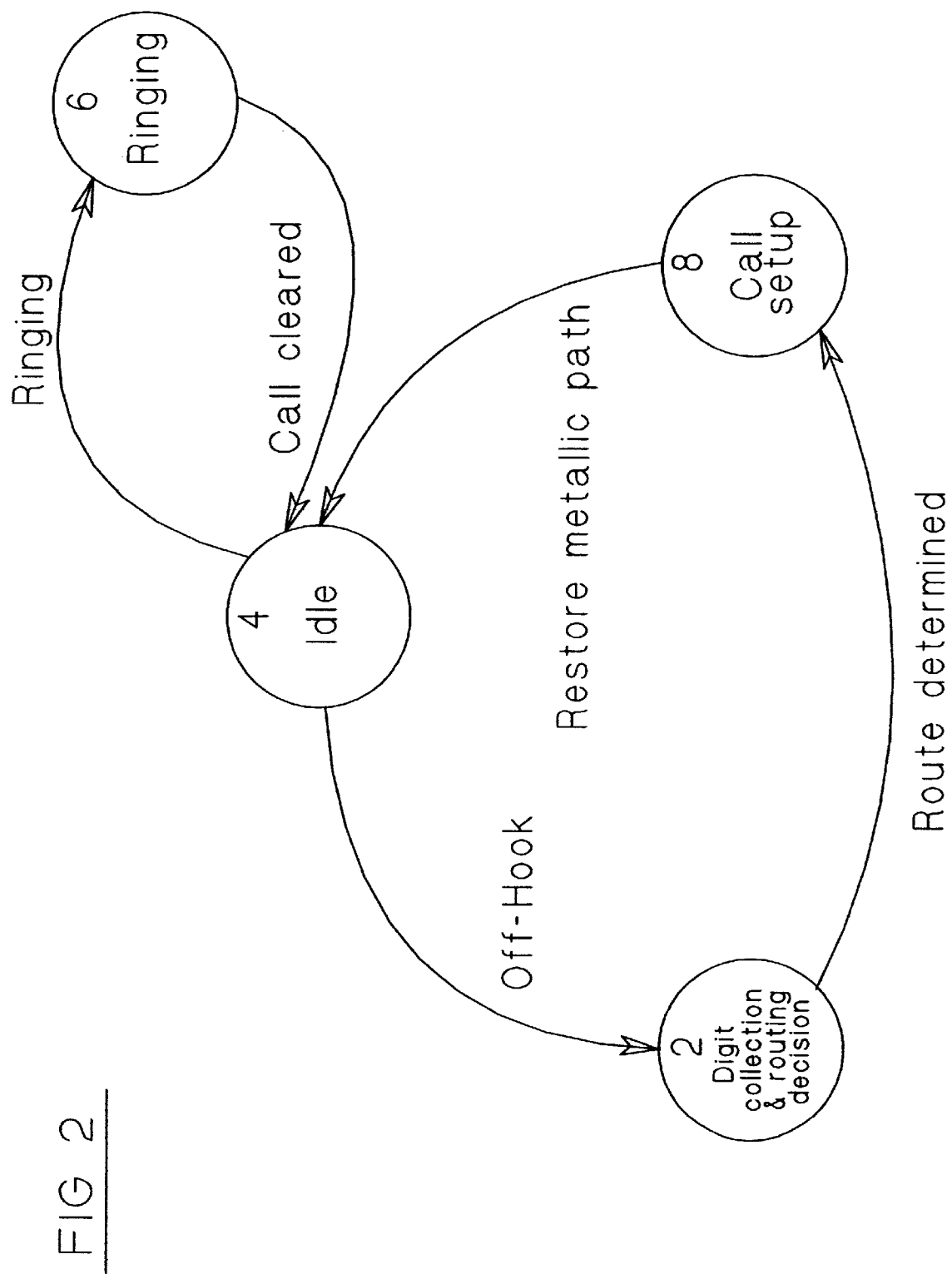
FIG. 2 is a simplified state diagram showing the various states of the LCR.
Figure 16:
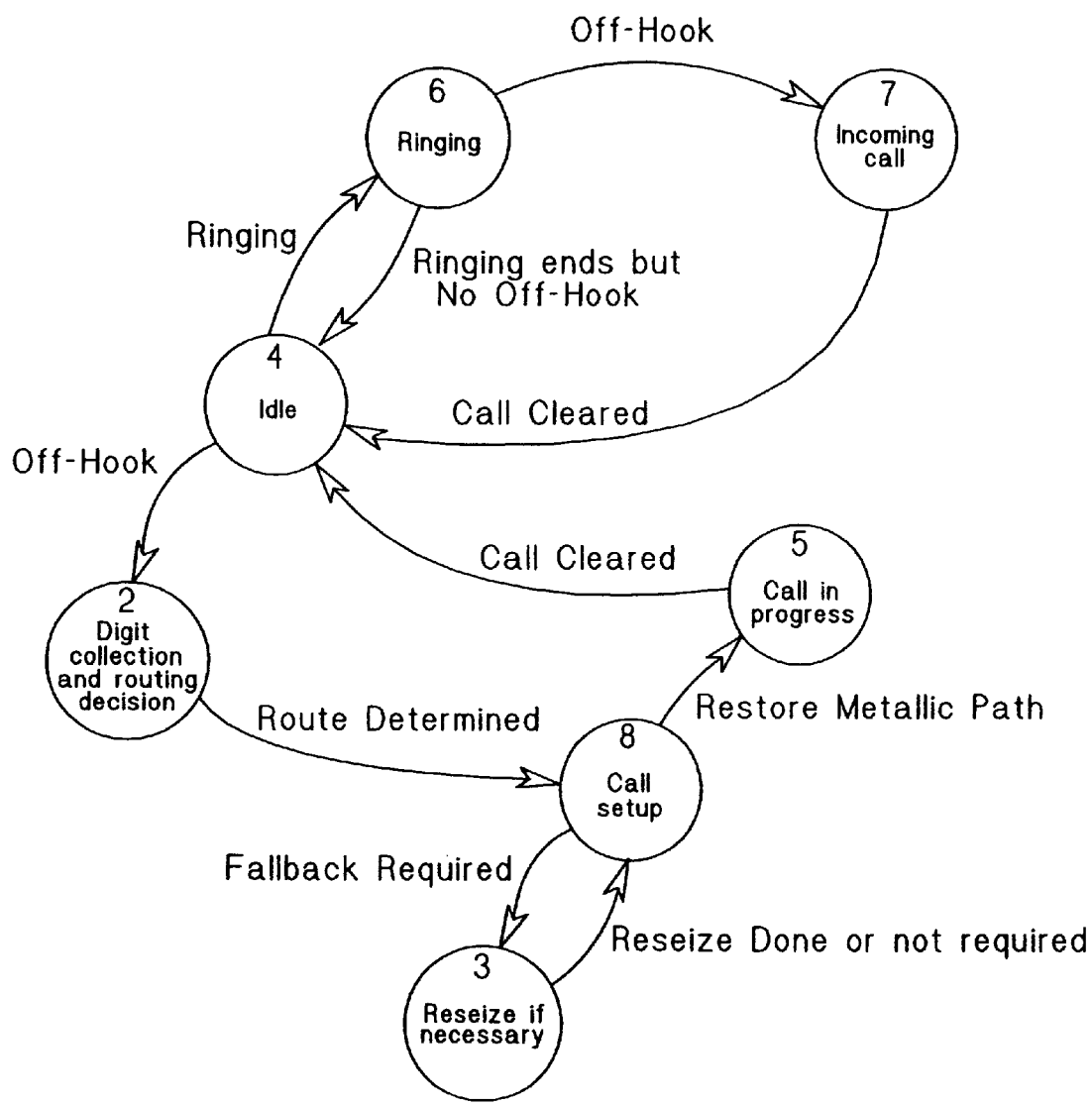
FIG. 16 is an expanded view of FIG. 2.

The telephone line interface is controlled by a combination of electronic and mechanical relays which will be referred to as switches in the following descriptions. The basic operation of the LCR is to intercept the number dialled by the user (PBX) and by inspection of the digits dialled to dial any digits necessary and monitor the network tones in order to route the call via a indirect carrier. An overview of the states of operation of the LCR is shown in FIG. 2 in an expanded view in FIG. 16, and in greater detail in the switching diagrams of FIGS. 5 to 9.

In the idle state 4, which persists while no call is in progress, a metallic path is provided through the LCR with the switches in the state shown in FIG. 6 (described later). This state monitors for the presence of line current and ringing condition. When line current has been detected for long enough and an incoming call has not been detected due to the absence of ringing, the LCR recognises that an outgoing call is being made and the SPLIT, LOCAL, SEIZE switches operate to the switch state shown in FIG. 7. The LCR in this state holds the exchange line via the SEIZE gyrator 24 and providing a local battery 20 to the subscriber (PBX) 10 such that dial tone multi-frequency (DTMF) and loop disconnect signalling issued by the subscriber will be detected by the LCR but will not pass through to the exchange line 12. The LCR will remain in this state until sufficient digits have been collected to make a routing decision or until a time-out occurs. A fullback position 3 may be used if required.

In the digit collection and routing decision state 2, the LCR control software determines a 'best match' between the digits dialled and the digit strings stored in a lookup table. This operates so that for each new digit received from the PBX (user) the lookup table is checked for a match with the digits received. If a match is found and there are no better matches (lookup entries with more digits), then the route is determined and the access procedure for the chosen route is invoked. If a match has been found and a better match potentially exists in the lookup table the routing decision is postponed until further digits are received. If no match exists the routing decision is postponed until further digits are detected.

A typical digit lookup table is shown in FIG. 3. The digit lookup table shown has four columns labelled: digits, route, fallback route and map to digits. As an example the first entry in the table is the digit string "O" which will cause the call to be routed by Mercury 131. On receiving a zero, and no subsequent match in table is found, the call is routed to Mercury. There is no fallback route selected and no digit is mapping to be effected. The sixth entry in the table has the digit string "01281240460", which is to be sent via a private network with a fallback to Mercury if the network is unavailable, and digit mapping so the number is regenerated as "17500460" to the private network. The lookup table stored in the LCR may be defined by a maintenance provider and amended by the user. This allows the table to be redefined if the price of a particular carrier varies to the cheapest alternative is always chosen if available, and also allows the user to add or delete entries to match. For example, the string "071" may be deleted and regenerated as "0171" to allow for a change in United Kingdom dialling codes, in case the user forgets to insert the additional "1".

The operation of choosing the digit string match is thus as follows. The first digit received by the LCR is analysed, and if a single match is found, the routing decision is made. However, if there are several digit strings in the lookup table which may match the received digit, the subsequent received digit is analysed. If then a single match of the numbers received so far and a digit string in the lookup table is found the routing decision is made. If more than one match exists, the process is repeated until a single match is found, at which stage the muting decision is made.

Figure 9:
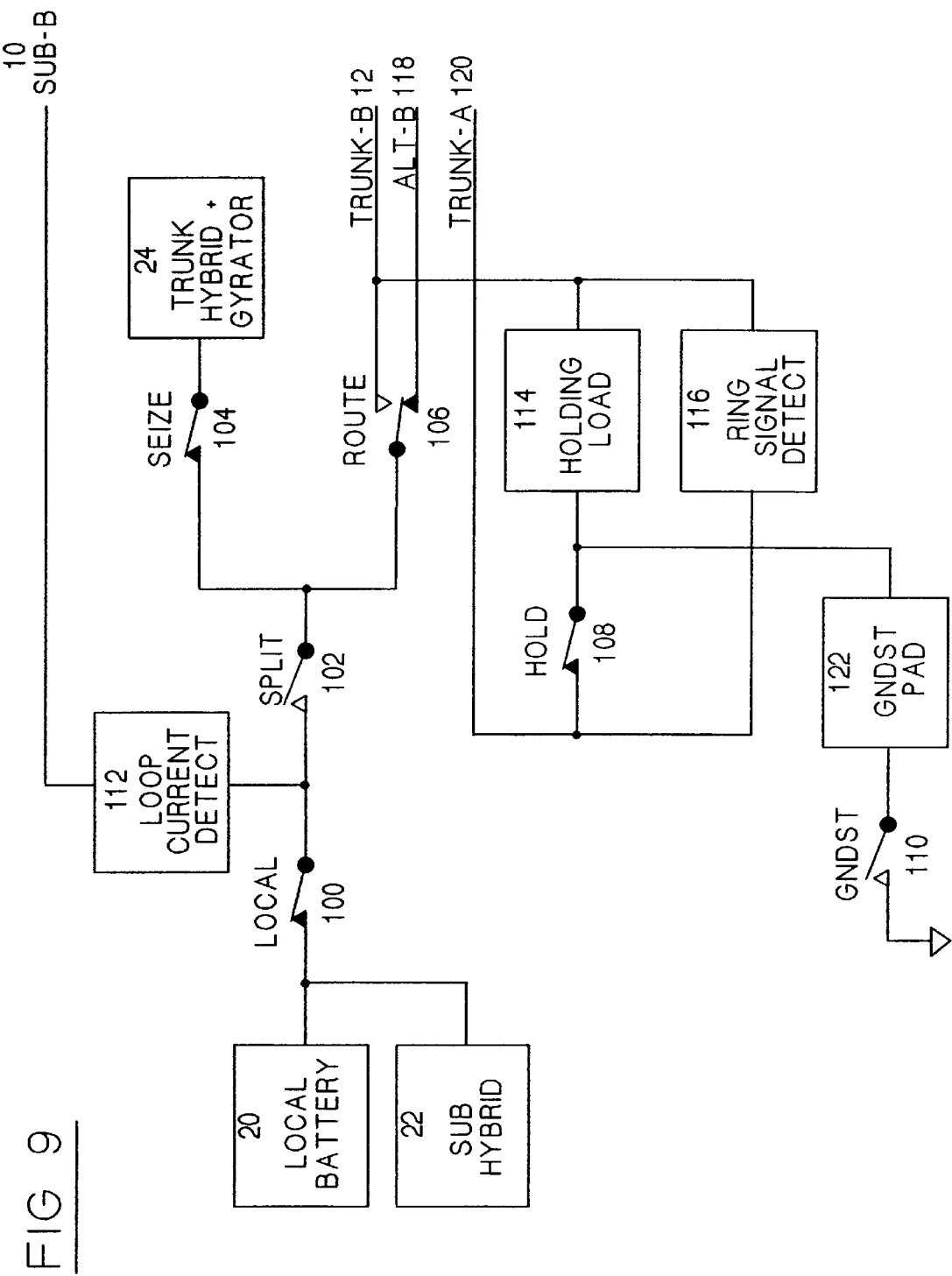
FIG. 9 is the switching diagram of FIG. 6 with the LCR in a route setup state to an alternative path.

If the route chosen is to an indirect carrier over an exchange line then the carrier access procedure programmed is followed, shown as state 8. This typically would dial the carrier access number and monitor for proceed/failure network progress tones using the soft tone detection system (described later). The access procedure typically monitors for Equipment Engaged Tone (EET) after dialling the access number to check for interconnect congestion. If the LCR detects interconnect EET, then the control software 'fallbacks' to a alternate carrier (or BT) by releasing the exchange line and reseizing using the SEIZE switch. If the route chosen is a network enforcement route (Forced Private Network Loopback) then the switches are set as shown in FIG. 9. This action places a hold on the exchange line preventing incoming calls and select the alternate circuit. The ringing state 6 denotes the receiving of a call shown as 7.

Figure 10:
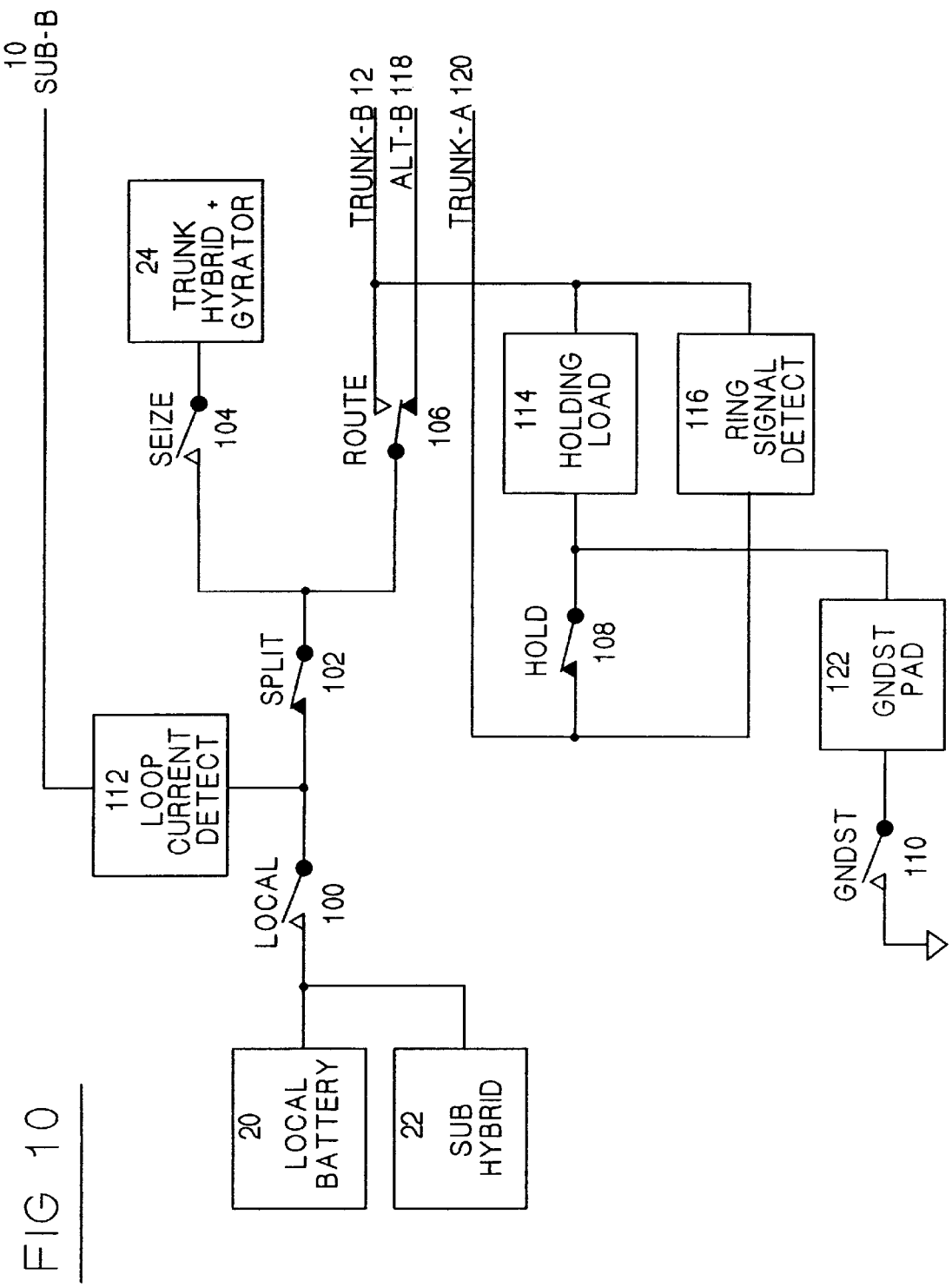
FIG. 10 is the switching diagram of FIG. 6 with the call routed to an alternative path.

The call connected state 5 is shown in FIG. 10. Once the call has finished, and a call cleared indication is given, the LCR returns to the idle state 4. Other tones are monitored in addition to EET tones. For example, the 1111 Hz tone provided by Mercury may be monitored, indicating that the network is ready to receive the Mercury authorisation number.

Figure 4:
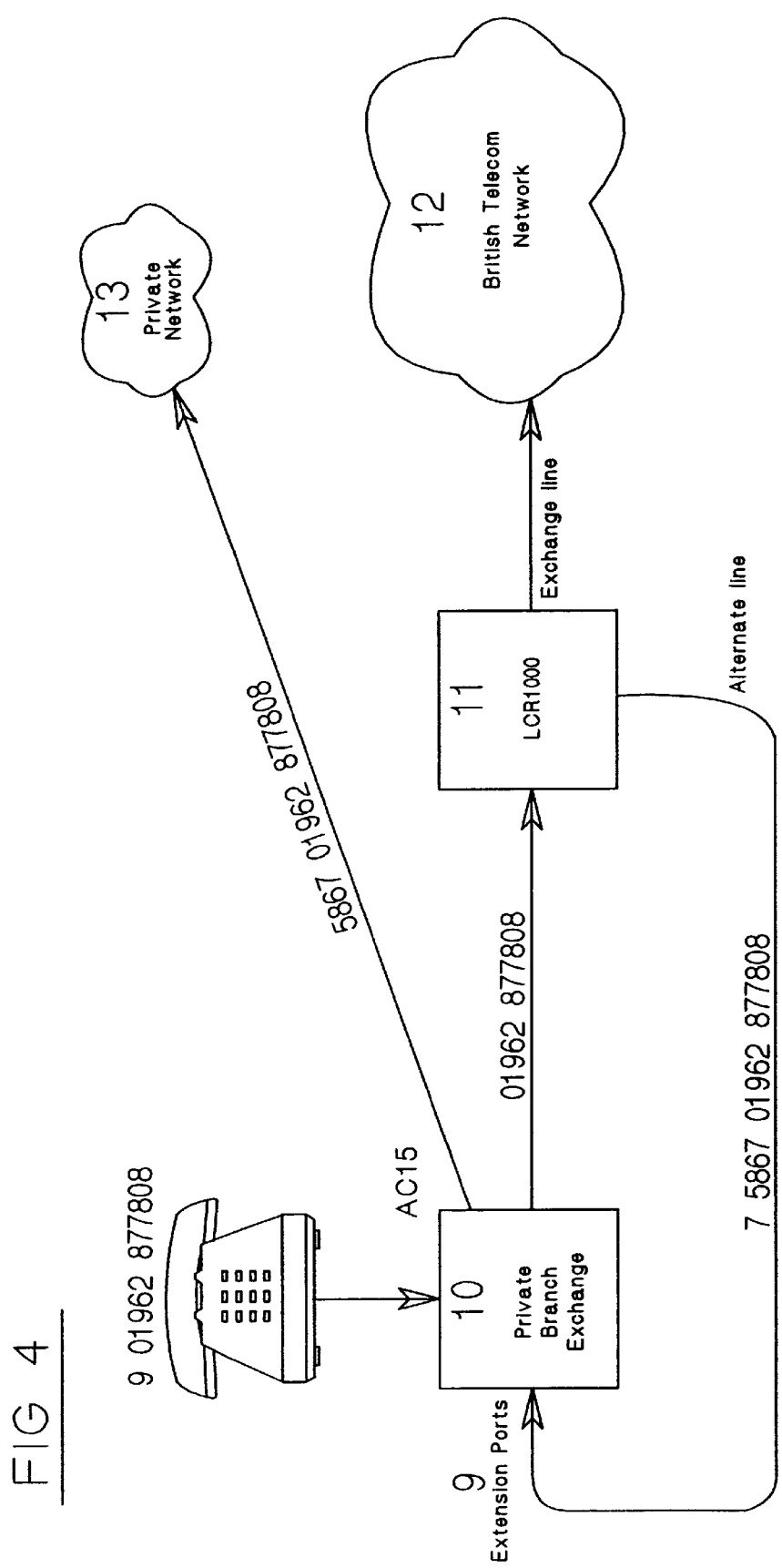
FIG. 4 shows an overview of a call routed by a private network forced using the first aspect of the invention (Forced Private Network Loopback)

The network enforcement facility of the LCR is illustrated in FIG. 4 and provides a mechanism whereby telephone calls that could be routed over an organisation's private network 12 are identified by the LCR "and routed back into the private network via private branch exchange (PBX) extension ports 9. The LCR utilises an alternative switching capability and exchange line hold facility to route the call; the calls made are captured by the LCR 11 before sending to a local exchange 12, and are routed back to the PBX 10 for sending by a private network 13.

The LCR also has the facility to fallback to a different loopback carrier, or to an external carrier using the exchange line.

Figure 5:
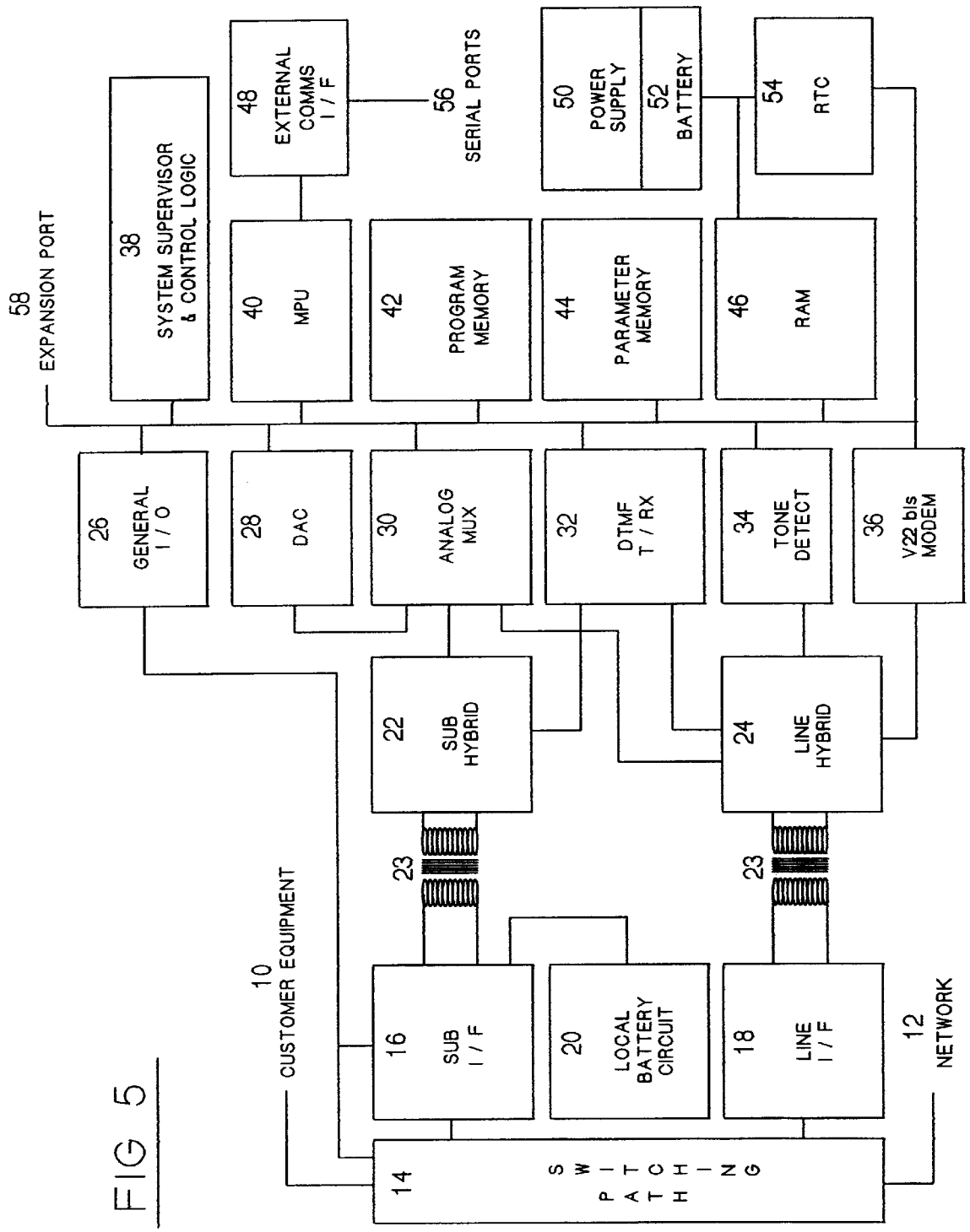
FIG. 5 is a block diagram of a Least Cost Router device embodying the invention.

In FIG. 5, the customer equipment 10 (such as a PBX) is connected via the switching path 14 to the network 12, such as a local exchange. The path switching block 14 allows each line from the customer equipment to be selectively disconnected from the associated network line 12, or rerouted to an alternative circuit as required. The path switching block is described in greater detail later. As is previously described, in the normal state, the transparent path is provided between the customer equipment 10, and the network 12, by the path switching block 14. On sensing a dialled number, however, this transparent path is broken and subsequent operations are governed by the remaining integers shown in FIG. 4.

The subscriber interface block 16 (sub I/F) performs the task of interfacing to the network line for each channel. It incorporates a line isolation transformer to provide galvanic isolation between the subscriber and the LCR unit it also incorporates a galvanically isolated sensor (not shown) for the purposes of sensing the presence (or absence) of current flow in the subscriber circuit. During a call routing, digits dialled by the customer equipment 10 are fed to the LCR by the subscriber interface block 16. Similarly, a line interface block 18 performs the task of interfacing to the network line for each channel. This also incorporates a line isolation transformer, and additionally incorporates a gyrator circuit (electronic inductor equivalent) for the purposes of providing sufficient line holding current whilst presenting a high impedance to AC signals in order to maintain a connection with the network whilst the LCR is in the call setup phase of its routing function. Additional circuitry is included for the detection of ringing signals from the network 12 for each line, and for the purposes of network line parking and ground start signalling.

The subscriber interface block 16, and the line interface block 18, are connected to the sub hybrid block 22 and line hybrid block 24 respectively. These blocks perform the task of two to four wire signalling conversion for each interface block 16,18. Each hybrid block 22, 24 employs identical analogue circuitry whereby the transmitted signal to line is separated from the received signals from line by local subtraction of the transmitted signal component at the receiver. Each block also contains impedance matching circuitry whereby a wide range of line characteristic impedances may be accommodated. Together, the subscriber and line interface and hybrid blocks 16, 18, 22 and 24 provide the connection between the LCR and the switching path 14.

When the switching path 14 is not transparent, digits are sent to the subscriber blocks 16, 22 and digits are sent to the network by line blocks 18, 24. A local battery circuit 20 is connected to the subscriber interface block 16 and provides an isolated source of power for signalling purposes to each subscriber circuit when that circuit is disconnected from the network during the routine setup phase. Each local battery circuit consists of a switched constant current source which is protected against short circuit, over voltage and reverse voltage connection. It is also provided with a visual indication of activity when in use. Identical circuits are used for each subscriber line connection.

The main components governing the operation of the LCR are the main processing unit 40, the program memory 42, the parameter memory 44 and the RAM 46.

In this embodiment the main processing unit 40 (MPU) is an Intel 80C188EC, which is a general purpose VLSI 16 BIT CMOS high integration microprocessor design for embedded applications. The MPU 40 incorporates two full duplex serial Interfaces with independent baud rate generators, four independent direct memory access controllers, two programable interrupt controllers, three programable 16 BIT timer counters, 132 BIT watchdog timer and ten programable chip selects with an integral wait state generator. It has a low power static processing core which implements an enhanced version of the Intel 8088 CPU machine architecture and order code.

The program memory block 42 provides storage for the main control software held in read only memory (ROM) which is required to implement the least cost routing function. A single socket is provided which allows devices of up to 512k bytes storage capacity to be fitted, together with the necessary support circuitry to enable these devices to be either one time programable (OTP), ultra violet erasable programable (EPROM), or electrically erasable reprogramable (EEPROM). Additional circuitry is provided to permit either 12 VPP or 5 VPP EPROM devices to be used for program storage.

The RAM block 46 provides fast random access storage which is used during program operation for temporary storage of program variables. It may also be used for the real time storage of call routing statistics if required, and circuitry is provided to permit the RAM block to be provided with standby power in order that information may be correctly maintained under power failure conditions.

The parameter memory block 44 provides storage for system routing parameters which are set by the user, or by the installer when configuring the LCR for the first time. A single socket is provided, which allows devices of up to 512k bytes storage capacity to be fitted, together with the necessary support circuitry to enable these devices to be either OTP ROM, EPROM or EEPROM. This allows either fixed parameter storage, erasable storage, or erasable reprogramable storage where in situ routing parameter table changes are to be performed.

The MPU 40 and program held in program memory 42 together with the RAM 46 and the parameters stored in parameter memory 44 thus control all the routing decisions and other functions of the LCR. Additionally, a system supervisor and control logic block 38 provides the additional system sub-functions of internal voltage monitoring, system integrity monitoring and fail safe selection, standby battery switching, system status indication via a tri-colour display, subsidiary IO/address decoding and control, RAM and RTC data protection and MPU reset control generation.

The remaining integers in FIG. 5 are described below, and provide general input and output functions for receiving and generating signals.

The external communications interface block 48 provides voltage level translation and buffering between the microprocessor serial communications interfaces, and the external serial communications port. All external serial communications ports employ CCITT V24 signalling levels for intercommunication purposes between the LCR and external equipment. The particular advantage of the serial port is that an external personal computer may be connected to the LCR to provide the configuring functions and uploading of parameter data using a user friendly Windows based software package. The external communications interface block 48 also provides a special Intercommunication system which may link many LCR units together, communications being performed using a master/slave basis. Automatic master/slave selection is given by the position of each unit in the correction chain.

The general I/O block 26 provides a low level control and status data pathway between the MPU block 40 and the path switching block 14. The embodiment describes uses an 82 C55 peripheral Interface adaptor for this function. The DAC block 28 employs 4 digital to analog converters (DAC) operating independently under the control of the direct memory access controllers located in the MPU block 40. The DAC block 28 is used for call progress tone and voice guidance signal synthesis for all line circuits.

The analog multiplex MUX block 30 provides analog path selection of signals between DAC block output signals, the receiver output of the line hybrid block 24 and the input to the subhybrid block transmitter 22 for each line circuit as directed by the control program via the MPU block 40. Depending on the path selection made, either the relevant line network signal, or any one of the 4 DAC output signals may be directed to each subscriber circuit. In this embodiment the analog MUX is an MT8809 device.

The DTMF T/RX block 32 contains the dual tone multifrequency (DTMF) transceivers for all the subscriber circuit. This allows MF signals to be received via the subhybrid 22 and to be generated and sent to the network 12 via the line hybrid 24. Each transceiver contains a DTMF decoder (which is connected to the receiver output of the subscriber hybrid) and a DTMF encoder (which is connected to the transmitter input of the line hybrid). In this way, DTMF encoded digits may be received from each subscriber unit and passed to the MPU block for use by the control program. Similarly, digits passed to each encoder from the control program by the MPU block may be encoded and sent to the network via the associated line hybrid. MT8888 DTMF transceivers are used in this embodiment.

The tone detection block 34 (described in greater detail later) is used by the control program to provide flexible tone detection facilities for call setup and progress monitoring purposes.

The V22 Bmodem 36 allows the LCR to be connected to a remote computer over the telephone network for the purposes of parameter updating and status reporting described later.

The RTC block 54 (real time clock) provides continuous time of day and day/date information to the main control program for routing, status and control purposes. A periodic interrupt is also generated and passed to the MPU block 40 for control program use. The RTC block 54 is powered by the standby battery system 50,52 in case of power failure in order to preserve time and date information. The power supply block 50 incorporating a rechargeable battery 52 provides all the power supply requirements for the LCR. The power supply provides a stable source of voltage and incorporates a charging circuit for the standby battery in case of power failure.

An expansion port 58 is provided to allow further facilities to be connected to the LCR at a later date.

Signal path switching diagrams of the LCR are shown in FIGS. 6 to 10. These figures are simplified and do not show all the connections between the unit, the network and the customer equipment. Each path of the connections comprises an "A-LEG" and a "B-LEG" to complete the line. In the diagrams, the "B-LEG" is shown for the Trunk, Alternative and Subscriber lines, and the "A-LEG" is also shown for the Trunk line. The switching paths for the "A-lines" which are not shown are similar to the "B-lines".

The operation of a simple prior art telephone circuit is well known. When a call is initiated, by lifting a handset to go off hook, a DC current flows between the A and B network wires through the internal circuits of the telephone. Normally, this loop current is all that is required to establish and maintain a connection whilst the telephone is in use. Them are two methods of dialling used to convey digit information. Modem systems use DTMF dialling whereby individual pairs if tones whose frequencies are arranged to fall within the signal passband of the telephone system are sent to the exchange equipment via the trunk A and B wires to denote a dialled digit. The second older system employs loop-disconnect signalling. In this system, the loop current is briefly interrupted by the dialling equipment for a period which is long enough to be recognised by the exchange as a break in loop current corresponding to a dialled digit, but short enough not to be recognised as hanging up.

The embodiment of the invention described can perform both DTMF and LD dialling. DTMF digits are sent via the Trunk Hybrid 24 whilst the seize switch 104 is in the on state. When in this mode, loop current is maintained by the gyrator circuit in the trunk line interface. For LD dialling, the holding load 114 is switched across the Trunk A 120 and Trunk B 12 wires, with the seize switch in the off state. Both the Trunk A and Trunk B lines are used for DTMF and LD dialling.

Figure 6:
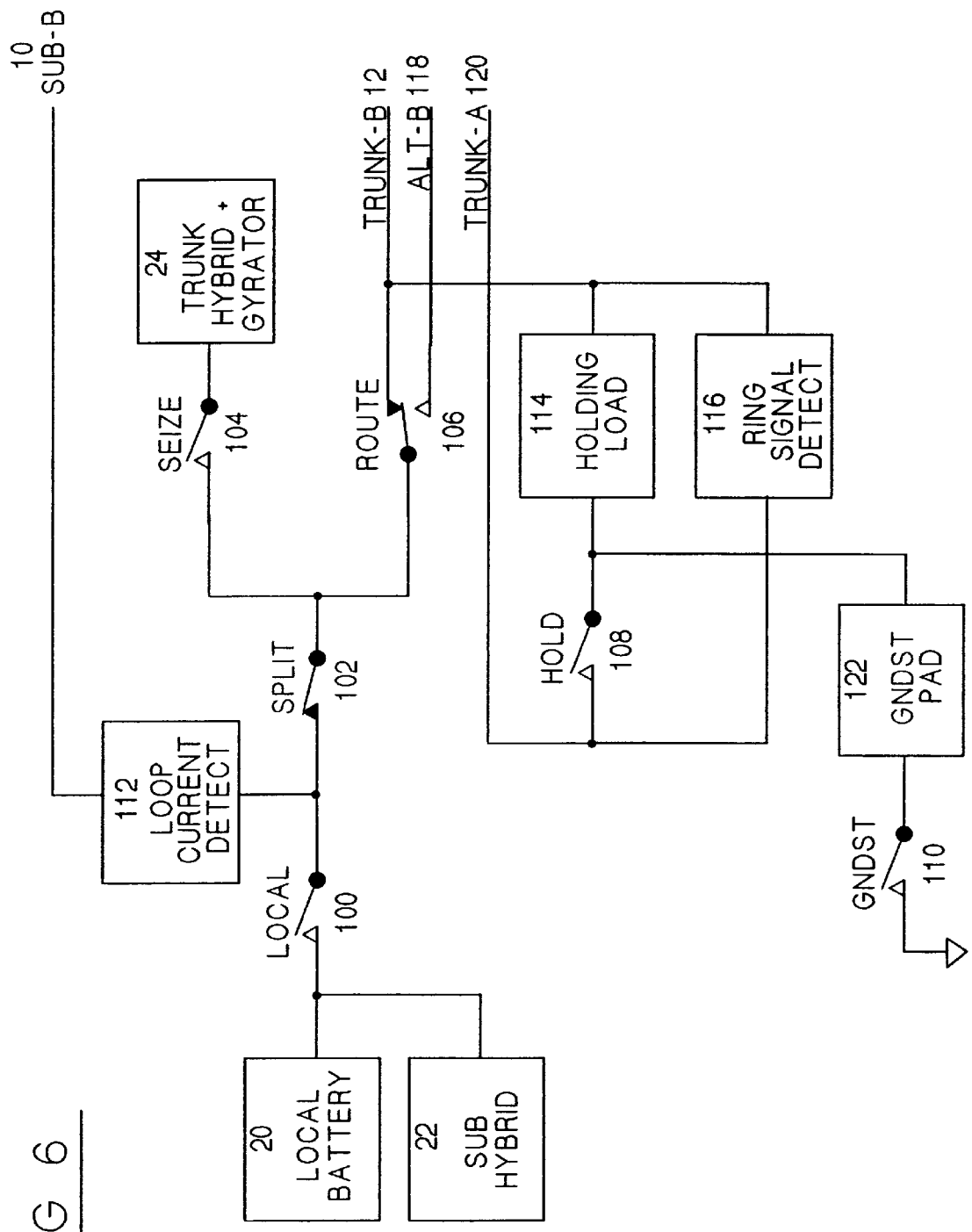
FIG. 6 is a switching diagram of the path switching block shown in FIG. 5 with the LCR in an idle state.

In FIG. 6, the transparent metallic path is established through the unit. Line current sensors and ring detectors monitor the line for activity. When an incoming call is detected the metallic path is maintained and the LCR monitors for a call cleared condition indicating that the telephone call has finished. In this position, the local 100 seize 104, hold 108 and groundstart 110 switches are open, and the split switch 102 is closed. The subscriber B line to the PBX 10 is connected to the Trunk B line 12 via route switch 106. The remainder of the LCR circuitry is effectively by-passed in this state, and simply monitors the line activity by detecting loop current at 112.

Figure 7:
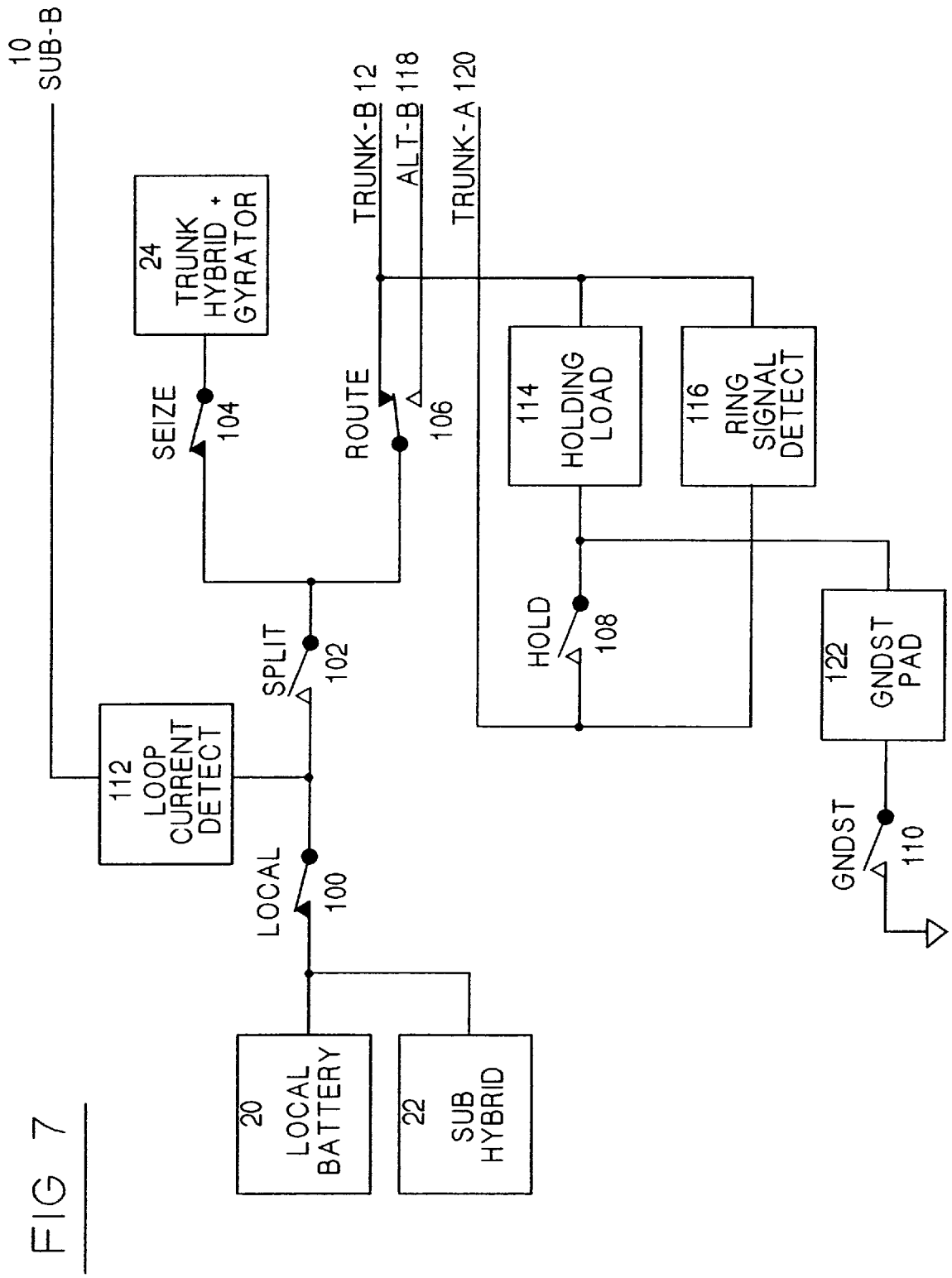
FIG. 7 is the switching diagram of FIG. 6 with the LCR in a route setup state with the LCR set to a normal carrier.
Figure 8:
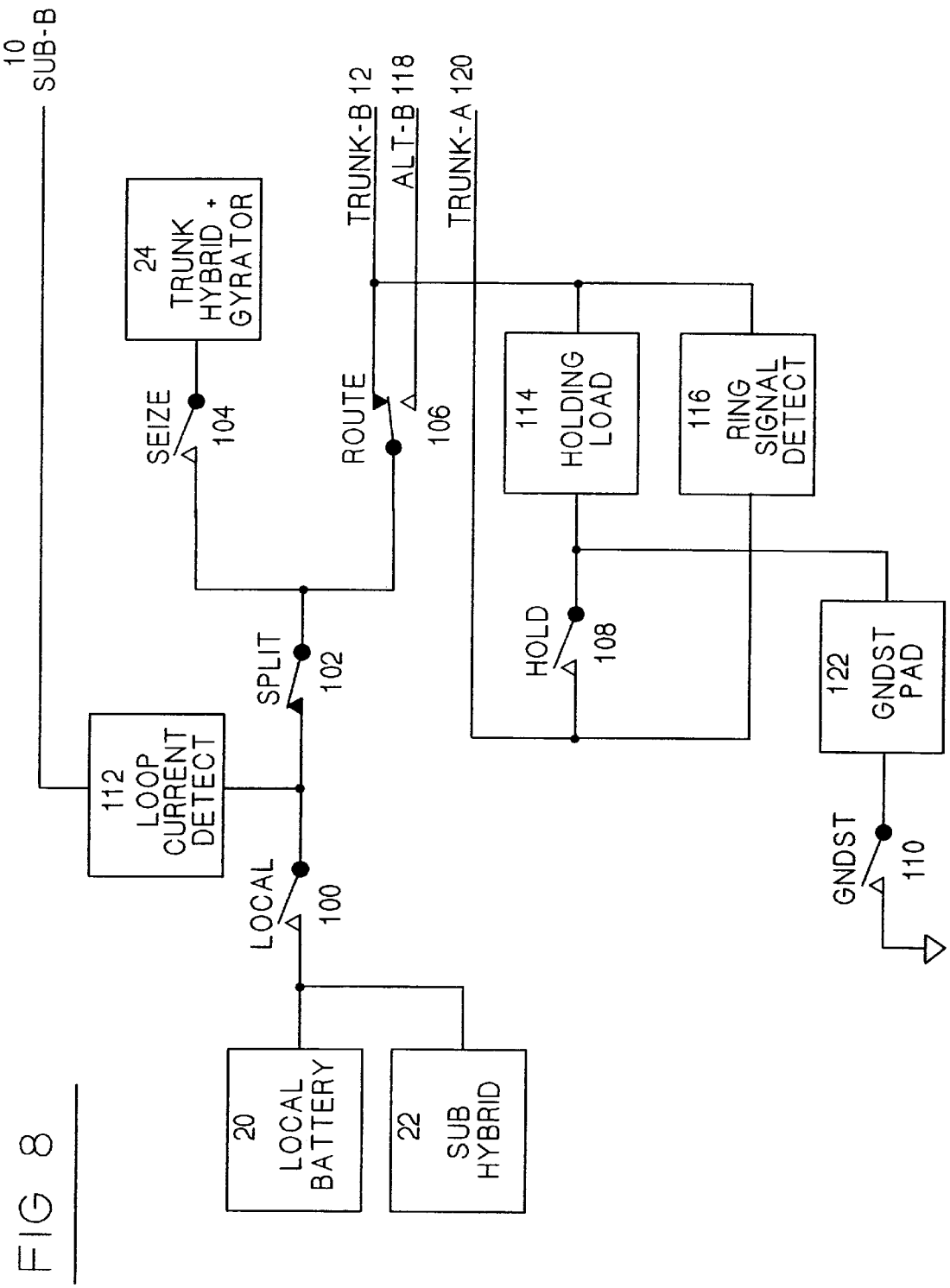
FIG. 8 is the switching diagram of FIG. 6 with the LCR in a call routed state with the carrier set to a normal path.

An outgoing call routed by a carrier will initiate the operations shown in FIG. 7. The metallic path between the PBX 10 and the local network 12 is broken, This is achieved by opening the split switch 102, and closing the local 100 and seize 104 switches. in this state, the subscriber B-line from the PBX 10 receives power from the local battery 20 within the LCR. The sub-hybrid 22 takes the dialled digits to the LCR (as previously described) which analyses the digits to make the routing and regeneration of digits decisions. The trunk hybrid and gyrator 24 takes the digits produced by the LCR and feeds them to the local exchange 12 via the route switch 106. The trunk hybrid 104 is used in the case of multi-frequency (MF) dialling. Alternatively, the holding load 114 may be used for loop disconnect (LD) dialling. Once the call is routed the switching arrangement will be as shown in FIG. 8. This state has the subscriber connected direct to the Trunk-B line 12 to a local exchange.

If the LCR decides that the call should be placed via the private network, rather than to a public carrier, (forced private network loopback) the route switch is set to the alternate B-line which loops back to the PBX as shown in FIG. 9. The hold switch 108 is closed, applying the holding load 114 to the trunk B-line to park the network The trunk 12 is "busied out" to prevent incoming calls. In this loopback position, the digits are regenerated by the LCR, as usual, but are fed back to the PBX for sending vie a private network. The call routed state for a looped back call is shown in FIG. 10. This state is similar to that shown in FIGS. 6 and 8, except the route switch 106 is set the alternate B-line 118 which loops back to the PBX, and the trunk B4ine is parked by the holding load 114 via holding switch 108.

Once the LCR has decided that the metallic path should be restored to establish the above call routed states (the route switch 106 may be in either of the trunk or alternate positions), as shown in FIGS. 8 and 10 the seize 104 and local 100 switches are opened, and the split switch 102 is closed. The subscriber B-line 10 from the PBX is thus connected direct to either the trunk B 12 or the alternative B lines 118, and the LCR is no longer in the metallic path. However, the LCR monitors the call progress and re-enters the path at the end of the call. The restoration of the metallic path upon deciding the routing of the call is described later with respect to the third aspect of the invention.

The LCR may fallback from a carrier to the same, or a loopback carrier. If the fallback carrier uses the loopback line, then it needs to be reseized. If the fullback carrier uses the trunk circuit, then the LCR determines whether to reseize or not. When the trunk is parked when a call is being set up on the loopback circuit, it appears to the exchange line that the user has gone off hook, but has not dialled any digits. In the U.K., the local exchange maintains a timer so that if no digits are dialled within roughly 20 seconds, then digits cannot be dialled without reseizing the line. The LCR maintains a timer so that if the fullback arises before the end of this period, there is no need to reseize the line, and the LCR can simply dial without reseizing. If the timer has expired, the trunk is reseized before dialling. The soft tone detection system may also be used to determine whether a dialling tone is still on the line, and the trunk is not reseized if one is present.

The LCR may absorb both MF and LD digits from the PBX, breaking the dial tone on the first digit received, when sufficient digits have been absorbed to make a routing decision, the LCR initiates the appropriate carrier access procedure. For example, the unit dials the carrier access code and then waits for the authorization proceed tone. Next, the authorization code is sent to the network, followed by the subscriber number to be dialled. In the case of a call routed via Mercury, for example, the Mercury access code 131 is dialled followed by a "wait for the authorization code" proceed tone (1111 Hz). Next, the authorization code is sent to the network followed by the subscriber number to be dialled. The metallic path is then restored so that the call connection is made.

An advantage of the holding load shown in FIG. 6 is that this load is purely resistive which circumvents the need for an additional toad to meet the load requirements for British Telecom, for example. The holding load thus performs a dual function for LD dialling and providing a resistive load to park the Trunk-B line when the call is routed by the alternate B-line.

Figure 11:
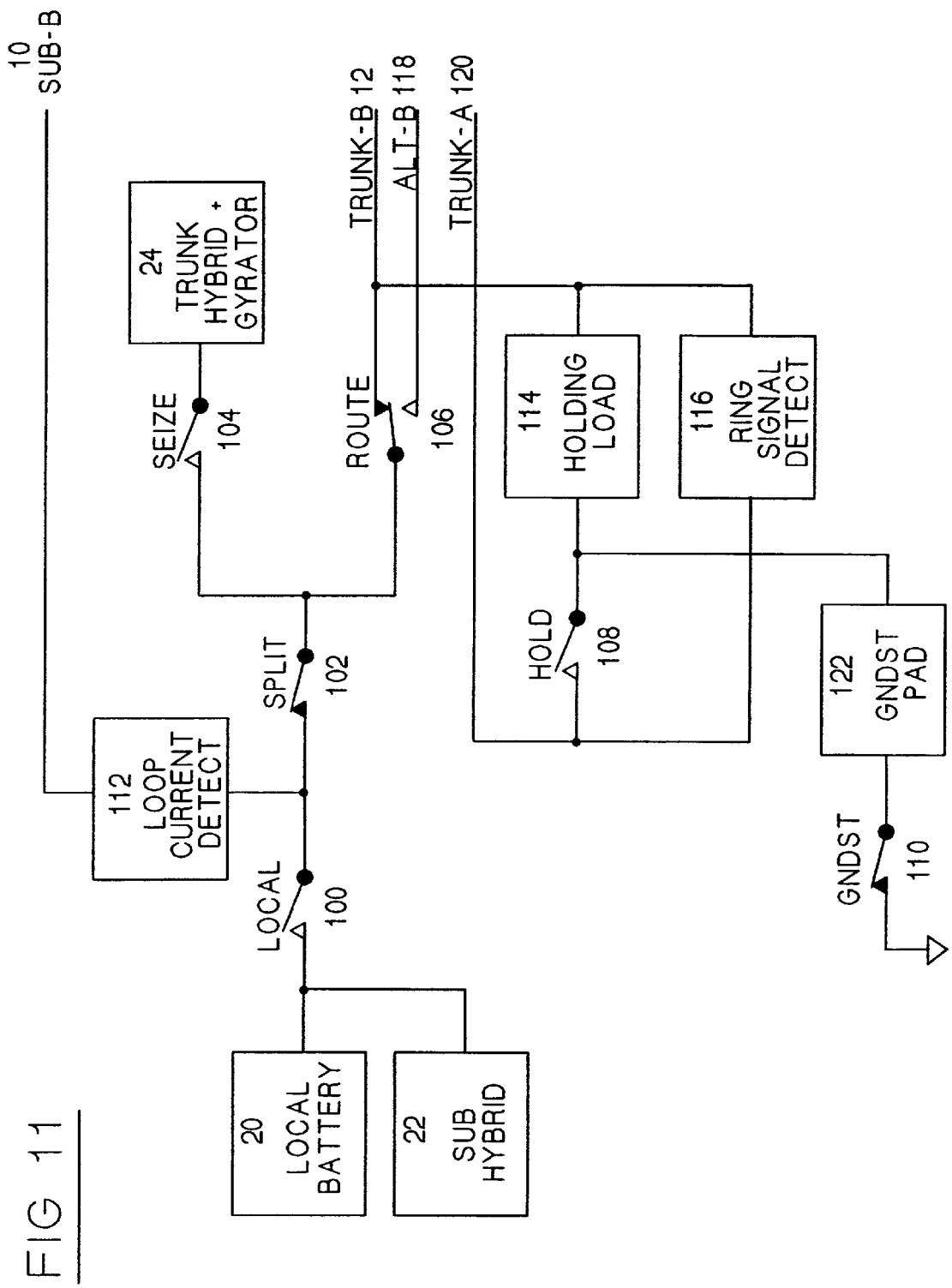
FIG. 11 is the switching diagram of FIG. 6 with the LCR in a ground start state.

FIG. 11 shows a ground start state for the switching diagrams previously described. In this state, the hold switch 108 is opened, and the ground start switch 122 is closed. The ground start state is required for some older exchanges to initiate a call, and is provided in the LCR to allow operation with such exchanges. Rather than simply connecting the A and B lines to allow a current to flow, an "attention" condition was required in such exchanges wherein current flows from the B-line to earth, rather than to the A-line. This condition is known as ground start. The attention condition is then recognised by the exchange as a current flowing in the B-line, with no corresponding A-line current. The holding load 114 functions as part of the ground start circuit along with the impedance pad 122.

The second aspect of the invention includes the ability to map dialled numbers to other pre-stored numbers, and the provision of scripts which allow the recognition of various stages in the dialling procedure and can provide a fall-back route if the first choice of carrier is unavailable, The set-up of the system will now be described with reference to the figures. When setting up the LCR, a number of parameters should be set by the installer and further parameters may be varied by the user. In addition, the LCR is conveniently provided with an integral V22BIS modem 36 to allow remote configuration of the LCR. The LCR is conveniently provided with an RS232 serial port 56 which allows connection to an IBM compatible PC running specific Windows software for configuring the LCR.

Short codes may be selected which allow the user to dial a short code in place of a full subscriber number. When the user dials the short code, the LCR regenerates the full subscriber number which is sent to the chosen carrier.

The digit look-up table should be set which allows the user to associates digit strings with particular carriers. It is these digit strings which the LCR analyses to determine which carrier a call should be routed by. Each digit string may be associated with a specific carrier or with a default carrier for the line on which the call is made. Flexible digits insertion and deletion allows the user to selectively keep or delete any digits from within the dialled number and to add digits at any point within the number.

A typical digit lookup table shown in FIG. 3 comprises a digit string to be matched, the carrier to be used for that string, a fallback mode and any digit mapping to be done. The lookup table is configured so that digits dialled may be compared to the digit strings, and if a match is found the call is placed by the relevant carrier.

For example, if the user dials the digits "01256" followed by a subscriber number, the LCR will receive these digits one at a time and compare the digits received to the digit strings in the lookup table. The LCR first receives "0" which could be a call to be routed to Mercury. However, on checking subsequent digits it is found that a larger match is found. The successive digits are checked until a match is found and the routing decision is made.

The carrier definitions should be set. These definitions comprise: selection of either the exchange line or the alternative line, a choice of switching to MF or LD dialling; the storage of the dialling excess number for the carrier (eg, 131 for Mercury); the dialling of the authorization code which is specific to the carrier; a timed pause; the sensing of a particular tone which signifies correct connection or failure and the dialling of digits which result from digit insertion or deletion of the dialled number with reference to the digit look-up table. All these parameters may be set when the LCR is installed for the first time and may be varied at any time during operation. Typically, the user will initiate a modem connection of the LCR to a service center at regular intervals so that the service center may perform checks on the LCR operation, and download new carrier routing information.

A number of 'scripts' may be set which provide fallback positions and alternative carriers in the event that the first choice of carrier is unavailable. This applies equally to forced loopback, in which the private network is unavailable; the call must then be sent by a public carrier.

Figure 12:
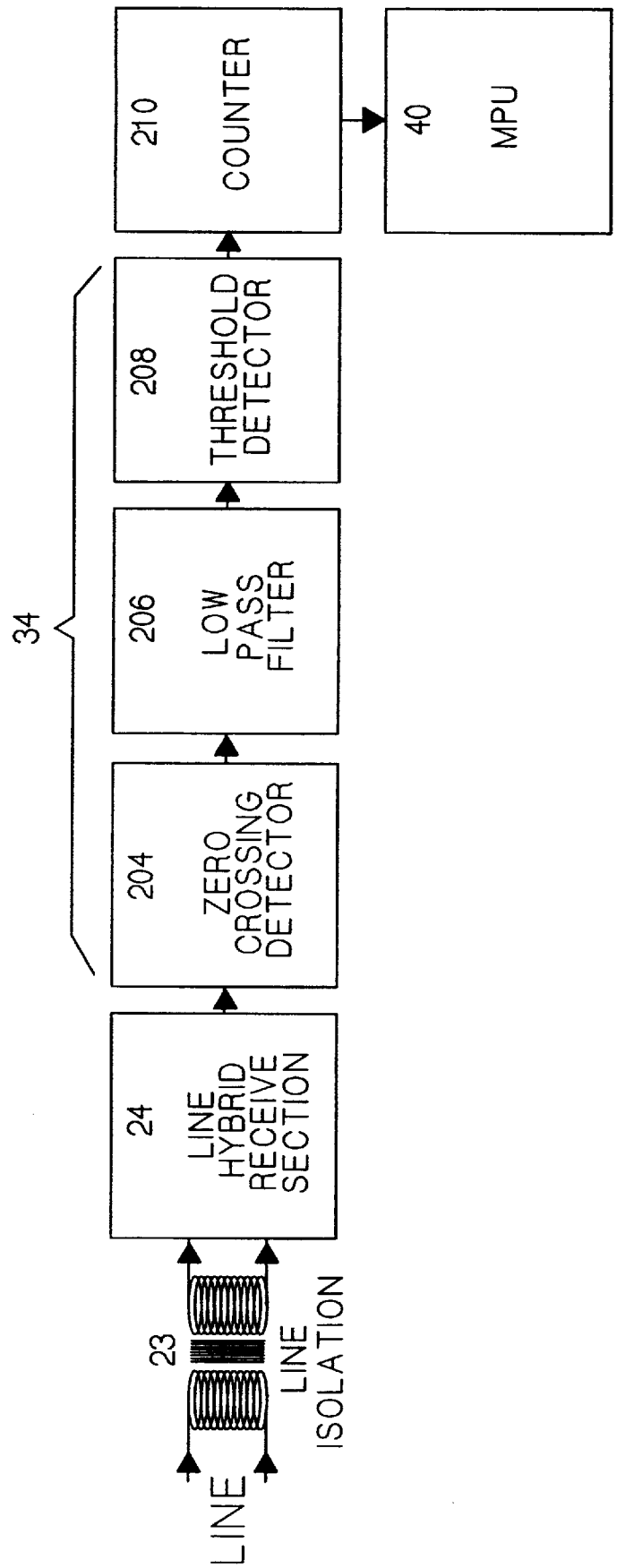
FIG. 12 is a block diagram of the soft tone detection system

The soft tone section system identified as block 34 in FIG. 4 will now be described with reference to FIG. 12.

The soft tone section system allows tones received from a local exchange or network to be detected and interpreted by LCR. This allows reply signals sent from a carrier to be interpreted and acted upon during a call setup. For example, a call routed to Mercury via access code 131 receives a proceed tone of 1111 hertz, before sending the authorization code and Fe number to be dialled. The LCR may act upon such proceed signals received from a network and interpreted by the soft tone detection system.

Referring to FIG. 5, the soft tone section system 34 is connected to the network line by line isolation unit 23 and line hybrid block 24. The tone detection system has a connection to the MPU 40. As shown in FIG. 12, the soft tone detection system comprises a zero crossing detector 204 a low pass filter 206, a threshold detector 208 and a counter 210. The zero crossing detector 204 comprises a differential input analog voltage comparator (LM339), one input of which is referenced to an analog voltage reference. The voltage reference level is chosen to determine the sensitivity of the tone detection system, and may be decreased or increased if required in order to change the operating sensitivity characteristics of the tone detection system. Input signals to the zero crossing detector which cross the comparison voltage reference level, will cause a change in the state at the output of the voltage comparator. The output of the voltage comparator is, therefore a switch between one of two fixed voltage levels, one voltage level indicates that the input signal is greater than the comparator reference voltage, and the other voltage level indicates that the input voltage is less than that comparator reference voltage.

The output of the zero crossing detector is passed to a low pass filter 206. The purpose of this filter is to provide an upper bandwidth limit to all signals generated at the output of the zero crossing detector, and thus restrict the operation of the soft tone detection system to voice frequencies as defined by the operational frequency band width of the telephone system. This filter is set with the filter pole at 1600 hertz, and prevents spurious noise from being detected as a soft tone.

The threshold detector 208 receives an output from the low pass filter 206 and is a Schmitt trigger (74HC14) in this embodiment. The threshold detector applies a post filter threshold and limiting function to all received signals which have exceeded the minimum defined line detection limit and which are within the required operating detecting bandwidth. The threshold detector provides amplitude limited signal transitions at its output for all input signals which satisfy the above criteria. Together the low pass filter and threshold detector prevent short burst of spurious noise from being detected as a good signal. The output of the threshold detector 208 is passed to the counter 210 which is a 16 BIT binary counter (82C54). The counter will change its value according to the input signal transitions received from the output of the threshold detector. The output from the counter is a digital signal which may be read by the MPU 40. The MPU 40 (previously described) analyses the changes in the count values using known statistical and mathematical techniques to ascertain the frequency (or frequencies) present at the input of the soft tone detection system in this way, the tone detection system analyses received tones and passes them to the MPU 40 for use in recognising prompts sent from a local network during the call setup procedure.

Figure 13:
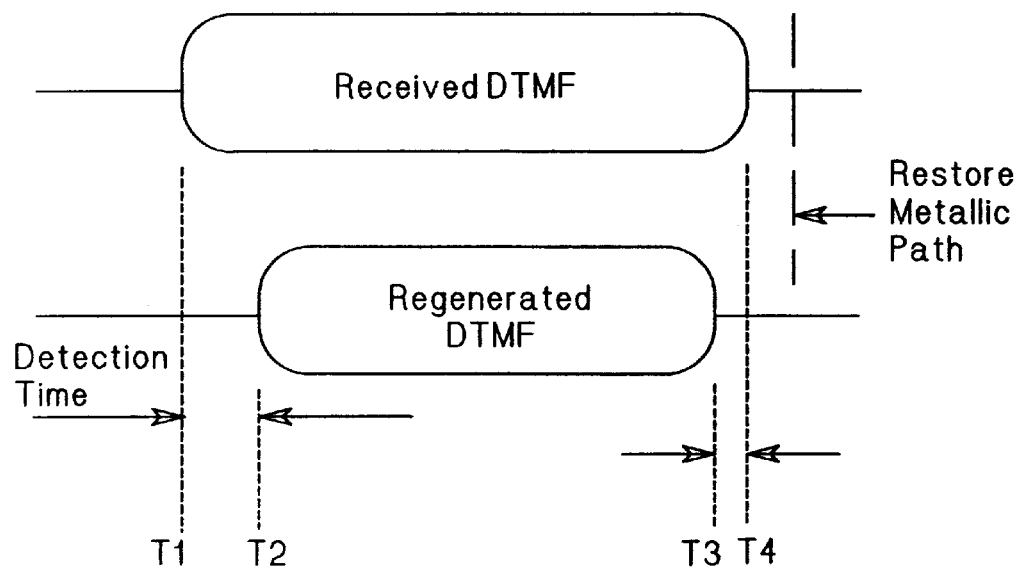
FIG. 13 is a timing diagram of restoration of metallic path in a first method of the third aspect of the invention.
Figure 14:
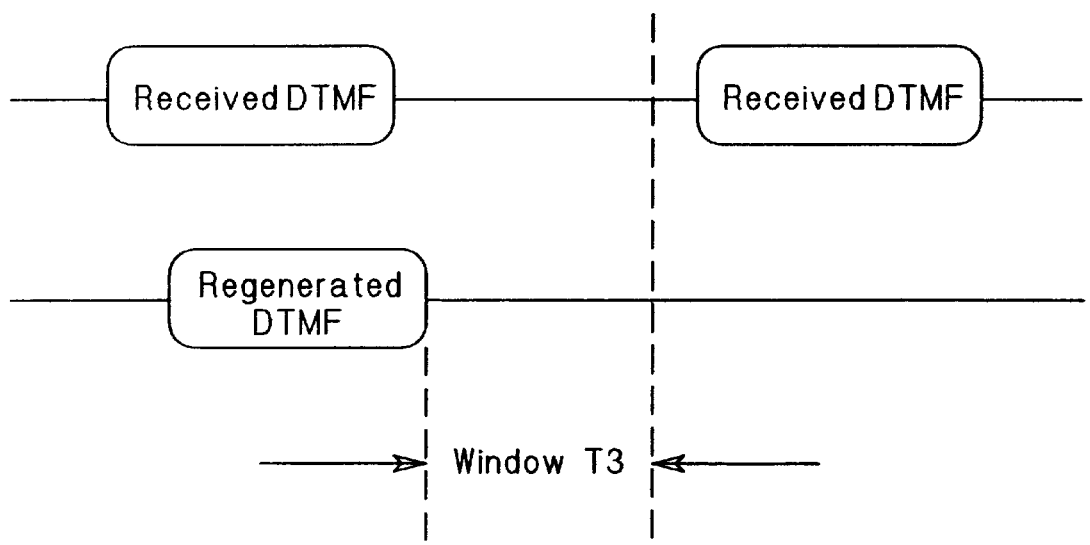
FIG. 14 is a timing diagram of restoration of metallic path in a second method of the third aspect of the invention.
Figure 15:
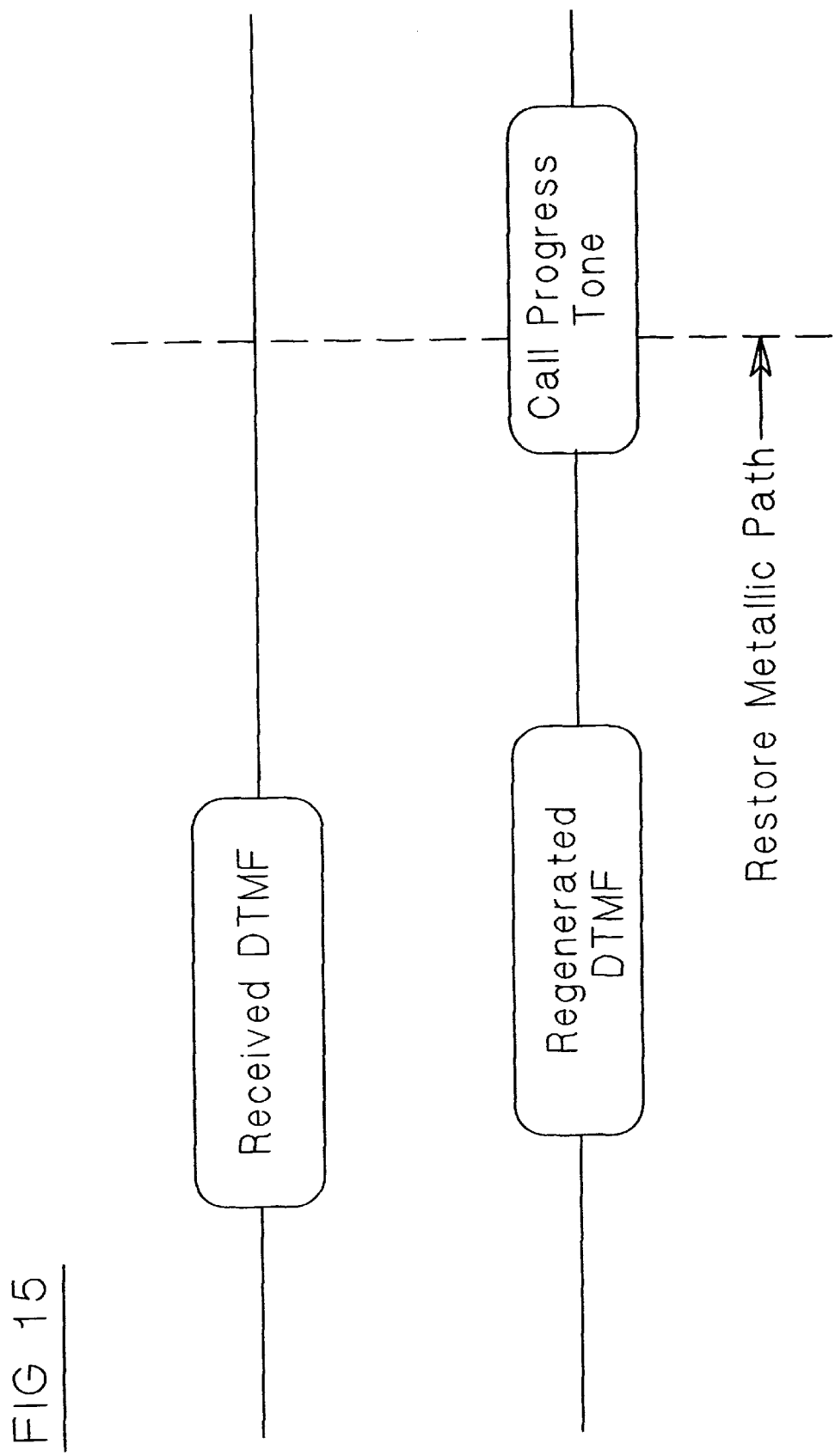
FIG. 15 is a timing diagram of restoration of metallic path in a third method of the third aspect of the invention.

FIGS. 13, 14 and 15 illustrate the third aspect of the invention and provide three methods for connecting the user's PBX to the local exchange (restoration of metallic path) as quickly as possible. The first two methods connect once the routing decisions and regeneration of digits has been completed, but before the user has completed dialling the full subscriber number. This advantageously allows the user to connect very quickly, and avoids the possibility that the user will not hear the first few seconds of the connected call, which could leave the other party connected to a seemingly dead line. Each variant also makes allowance for the fact that the user dialling may be effected by a human, or by a dialling machine such as a computer, or telephone memory store. The aspect generally operates by analysing the duration and spacing of dialled digits. This is especially effective when the analysis is performed at the same time as the routing decisions. Human dialling is characterised by being relatively slow and irregular, whereas machine dialling is fast and regularly spaced.

A first method, shown in FIG. 13, restores the metallic path immediately after a received digit (the user dialling) is completed. This is possible because a user typically takes longer to dial a digit than a machine such as the LCR. A received digit is detected at time T1. The time taken to detect and validate a DTMF digit is show as T2–T1 (typically 40 ms) at which point the LCR will start to regenerate the digit (taking typically 77 ms). At time T3 when the DTMF digit has been completely regenerated the LCR control software will check whether the receive DTMF tone is still active with the same digit. This is often the case for a number dialled manually by a user, as a typical reaction time is 200 ms. If this is the case then the LCR will restore the metallic path at time T4 when the received DTMF tone finishes. It is safe to restore the metallic path at this point since the LCR can be certain that there will be sufficient inter digit pause (IDP) between the last received DTMF and subsequent digits.

There is a minimum IDP standard which enables the LCR to be sure that the metallic path can be restored, this standard is nationally agreed so all automatic, or human dialled numbers will have a longer IDP than this standard.

In the second method of this aspect, shown in FIG. 14, analysis is performed by the LCR control software on the digit type (loop disconnect or DTMF) and the time interval between received digits to determine the dialling type (human or machine) and minimum observed inter digit pause (IDP). A human dialling will typically take longer to dial each digit, and will not dial uniformly. This information allows the LCR control software to determine if the window T3 will allow safe restoration of the metallic path. As shown, the received digit is not still active when the regenerated digit has been completed. Accordingly, the first method cannot be used in this scenario. If the determined minimum window T3 is sufficiently long, the metallic path is restored during this window.

The first and second methods are particularly effective where with human dialling as the duration spacing of the digits are likely to be long.

If the first or second methods are not suitable for re-establishing the metallic path, the third method may be used, as shown in FIG. 15. The third method utilises the LCR soft tone detection system (previously described) to check for the presence of call progress tones. Examples are ringing tone, busy, number unobtainable and voice. The metallic path is restored upon detecting a call progress tone. This prevents the first few seconds of a call from being missed by the user, which occurs in the prior art when a time period is left to ensure dialling is complete. The third method can thus prevent slow connection exhibited by the prior art.

The third method may be effectively used for machine dialling. In addition, if no progress tone is detected, the LCR may connect after a suitable timeout. In the prior art this timeout period is fixed. In this aspect, however, the recognition of machine dialling allows the timeout to be reduced to a time slightly longer than the machine dialling spacing, allowing much faster connection that in the prior art.

All three methods provide the advantage that the metallic path may be restored very quickly, and prevents a response from the other party from being missed, and may be used in conjunction with one another or independently.

Whilst the invention in it's various aspects has been described with respect to a metallic path, it is dear to one skilled in the art that the path form the user to the local exchange could be optical.

What is claimed is:

1. Apparatus for disconnecting and reconnecting a terminal to a network for use with a routing device having a store for storing parameters relating to carrier routing information, comprising a switching path for selectively connecting the terminal directly to the network or via the routing device, means for disconnecting the terminal from the network when digits are dialled by the terminal, means for deciding which carrier a call is to be routed by in dependence on the parameters in the store and the digits dialled, and means for reconnecting the network once the routing decision is made but before all the digits have been received from the terminal.

2. Apparatus according to claim 1, comprising means for monitoring a dialled digit, means for regenerating the dialled digit, means for checking whether the dialled digit is still active on completion of the regeneration, and means for reconnecting the terminal and network once the dialled digit finishes if the dialled digit was still active when the regeneration was completed.

3. Apparatus according to claim 1, comprising means for detecting the minimum time interval between digits dialled by the terminal, means for determining whether this minimum time is long enough to allow reconnection of the terminal, and means for reconnecting the terminal and network if the time is long enough.

4. A method of disconnecting and reconnecting a terminal to a network using a routing device, the routing device comprising a switching path for selectively connecting the terminal directly to the network or via the routing device, and a store for storing parameters relating to carrier routing information, the method comprising disconnecting the terminal from the network when digits are dialled by the terminal, deciding which carrier a call is to be routed by in dependence on the parameters in the store and the digits dialled, and reconnecting the network once the routing decision is made but before all the digits have been received from the terminal.

5. A method according to claim 4, comprising monitoring a dialled digit, regenerating the dialled digit, checking whether the dialled digit is still active on completion of the regeneration, and reconnecting the terminal and network once the dialled digit finishes if the dialled digit was still active when the regeneration was completed.

6. A method according to claim 4, comprising detecting the minimum time interval between digits dialled by the terminal, determining whether this minimum time is long enough to allow reconnection of the terminal, and reconnecting the terminal and network if the time is long enough.

7. A method of disconnecting and reconnecting a terminal to a network using a routing device, the routing device comprising a switching path for selectively connecting the terminal directly to the network or via the routing device, and a store for storing parameters relating to carrier routing information, the method comprising disconnecting the terminal from the network when digits are dialled by the terminal, deciding which carrier a call is to be routed by in dependence on the parameters in the store and the digits dialled, monitoring signals received from the network, and connecting the network and terminal if a call progress tone is received.

8. Apparatus for disconnecting and reconnecting a terminal to a network for use with a routing device having a store for storing parameters relating to carrier routing information, comprising a switching path for selectively connecting the terminal directly to the network or via the routing device, means for disconnecting the terminal from the network when digits are dialled by the terminal, means for deciding which carrier a call is to be routed by in dependence on the parameters in the store and the digits dialled, means for monitoring signals received from the network, and means for connecting the network and terminal if a call progress tone is received.

9. Apparatus for disconnecting and reconnecting a terminal to a network for use with a routing device having a store for storing parameters relating to carrier routing information, comprising a switching path for selectively connecting the terminal directly to the network or via the routing device, means for disconnecting the terminal from the network when digits are dialled by the terminal, means for deciding which carrier a call is to be routed by in dependence on the parameters in the store and the digits dialled, means for detecting the time interval of digits dialled by the terminal and means for reconnecting the network a time period after dialling is complete, wherein the time period is determined by the means for detecting the time interval of digits dialled.

* * * * *